Feb. 4, 1941.   F. L. FULLER   2,230,682
INTERLOCK FOR CASH REGISTERS
Original Filed June 26, 1936   4 Sheets-Sheet 1

INVENTOR
Frederick L. Fuller
BY
ATTORNEY

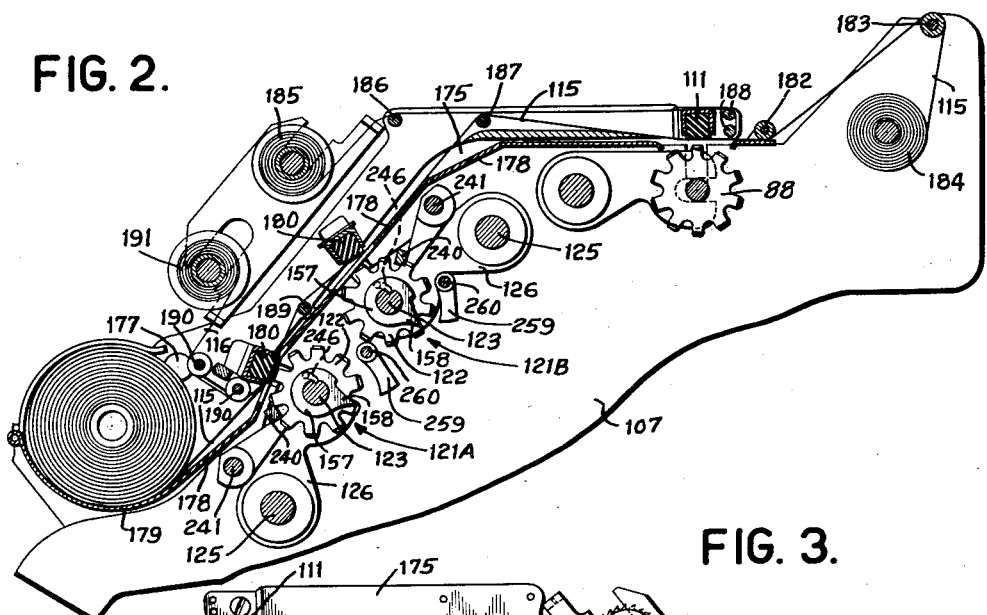

Feb. 4, 1941.   F. L. FULLER   2,230,682
INTERLOCK FOR CASH REGISTERS
Original Filed June 26, 1936    4 Sheets-Sheet 3

INVENTOR
Frederick L. Fuller
BY
ATTORNEY

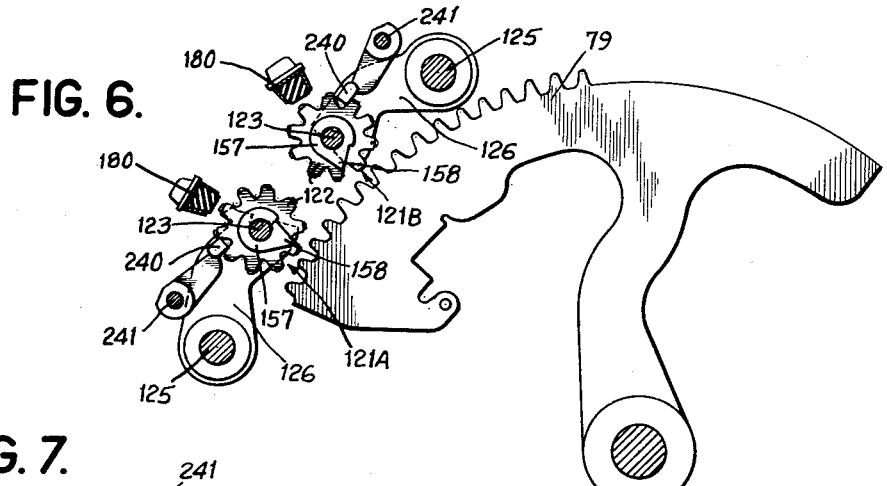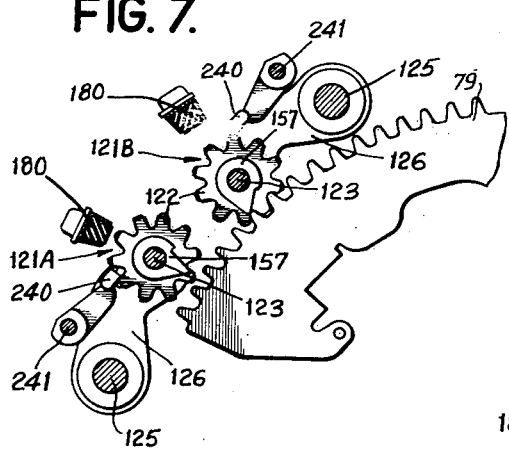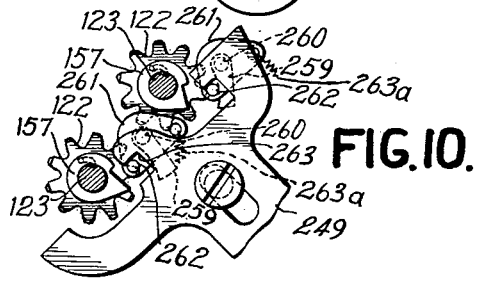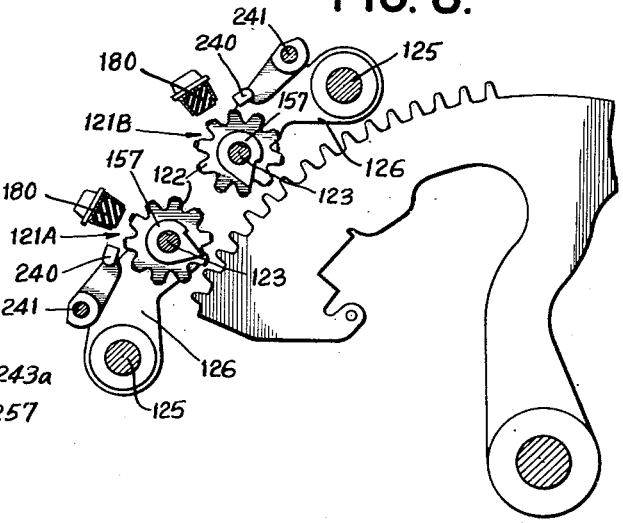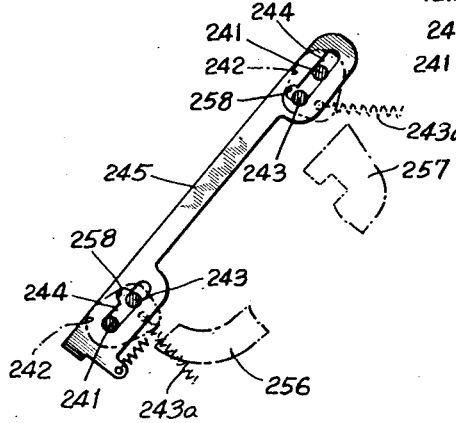

Patented Feb. 4, 1941

2,230,682

UNITED STATES PATENT OFFICE 2,230,682

INTERLOCK FOR CASH REGISTERS

Frederick L. Fuller, West Orange, N. J., assignor to International Business Machines Corporation, New York, N. Y., a corporation of New York Original application June 26, 1936, Serial No. 87,333. Divided and this application May 4, 1937, Serial No. 140,632

12 Claims. (Cl. 235—2)

This application is a divisional application of Serial No. 87,333 filed June 26, 1936, and which application discloses a cash register. Certain improvements therein are disclosed and claimed in this application.

The present invention relates to improvements in interlocking devices for cash registers by means of which fraudulent and improper operations are effectively prevented.

In the cash register of the type disclosed it is of importance to secure a printed total from the clerk's totalizers at the termination of the business for a period and such total imprints are readily secured from printing totalizers and the total prints are made on the detail strip on which are successively printed the items. The clerk should have access to the printing mechanism in order to replenish the supply of detail strip when it is exhausted and giving him this access will, in the cash register of the type disclosed, permit access to the totalizer wheels. Hence, in order to insure that the clerk may not fraudulently set the totalizer wheels to an improper setting to represent a value which is less than the amount in the cash register drawer, such totalizer wheels must be locked.

It is, therefore, the main object of the present invention to devise an improved construction which prevents any attempt on the part of a clerk to fraudulently change the totalizer settings rendered possible through the raising of a platen carrying frame of the printer which gives direct access to the totalizer wheels.

A still further object of the invention is to provide a single means for printing on the detail strip the totals standing on the totalizers.

Another object of the invention is to provide a single means for controlling resetting of the totalizers.

A still further object of the invention is to provide locking devices for the printing totalizer wheels which normally locks them against rotation but which locking devices are rendered ineffective by the means for controlling the resetting of the totalizers.

More specifically it is an object of the present invention to prevent said locking devices from being rendered ineffective by the clerk, and if an attempt is made to do so, the platen carrying frame will be locked against elevation so that the clerk cannot have access to the totalizer wheels when the locking devices are rendered ineffective.

Another object of the invention is to provide an interlock between the main operating bar which is operated to take a total printing operation and a resetting control lever preventing the operation of one when the other is being operated.

Another object of the invention is to provide means under control of the proprietor for permitting resetting of the printing totalizers and the operation of the total key which conditions the machine for total printing operations by the main operating bar.

Other objects and advantages will be apparent as the operation of the machine is understood from the specification and drawings in which:

Fig. 2 is a cross sectional view of the printing mechanism.

Fig. 3 is a view in side elevation of the left side of the printing mechanism.

Fig. 6 is a view showing the totalizers in normal position and locked by the locking bars, Fig. 7 is a view showing one of the totalizers in position ready to be actuated and unlocked for this operation, Fig. 8 is a view showing both totalizers unlocked preliminary to a reset operation, Fig. 9 is a detail view of the control slide.

Fig. 10 is a detail view of one of the locking devices provided for terminating the rotation of the totalizer wheels when the latter are reset to normal.

Totalizers

Figure 1:
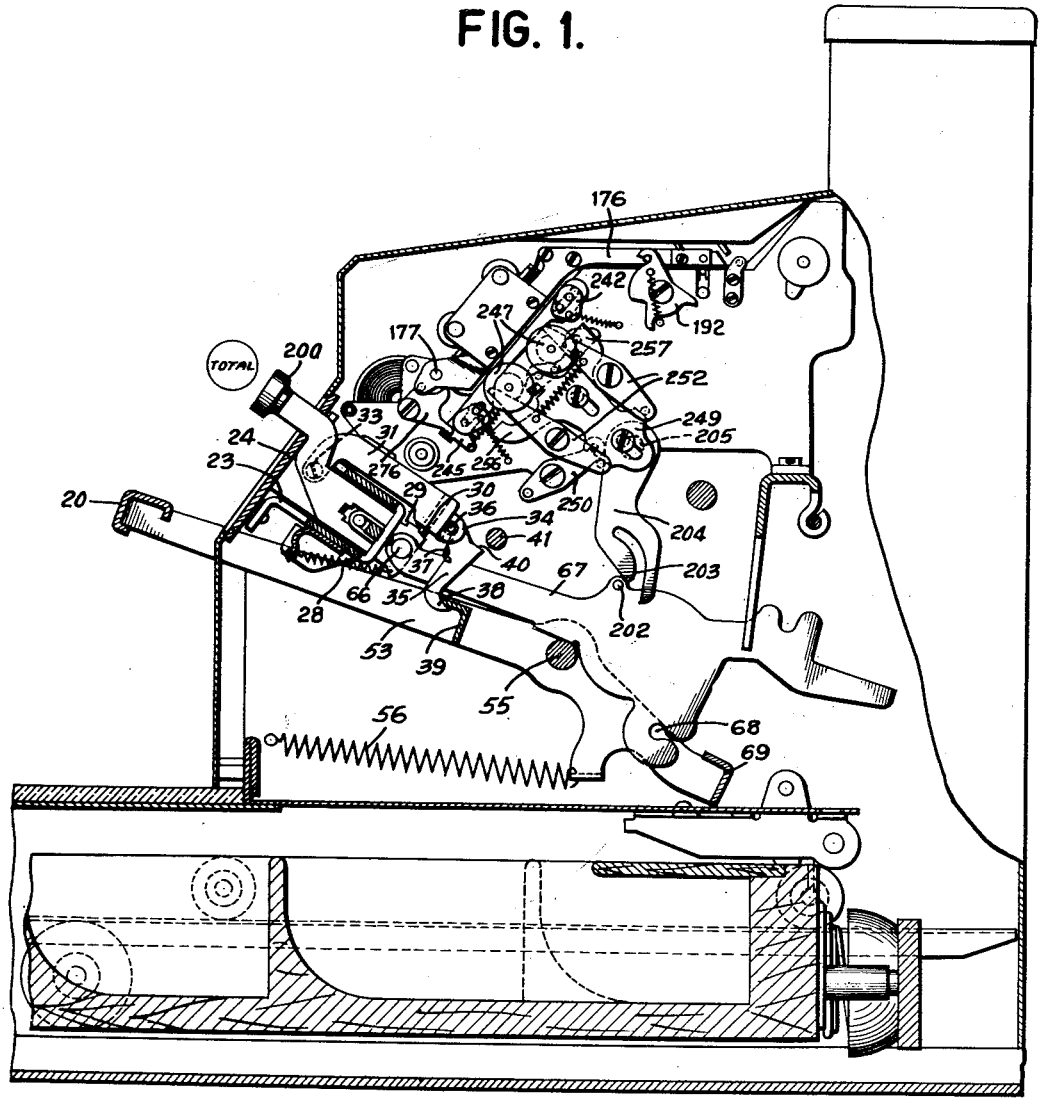
Fig. 1 is a cross sectional view of the cash register.

The machine shown in the above identified application is provided with a totalizing mechanism for adding the amounts and preferably with a pair of totalizers for selectively adding the amounts entered by the different clerks under control of their respective keys.

In Fig. 2 there is shown a pair of printing totalizers, 121A and 121B designating the two clerks' totalizers and each comprises a set of six totalizer wheels 122 provided with raised printing characters. Each series of totalizer wheels 122 is mounted on a related shaft 123 fitting in slots 124 (Fig. 3) in support frames 106 and 107. Carried by the support frames 106 and 107 is a pair of shafts 125 to each of which is secured a pair of arms 126 having open slots at their free ends for receiving a related shaft 123. To the shaft 125 of the "A" printing totalizer there is secured an arm 127 and secured to the shaft 125 of the "B" printing totalizer there is secured an arm 128. By rocking both of the arms 127 and 128 by means to be later described, the printing totalizers may be elevated to cause total printing.

Total printing key

The total printing key 200 (Fig. 1) is operable exterior of the machine and when depressed is latched in depressed position.

The total key is suitably guided since the stem passed through a related slot of a cover plate 24 and is further guided by a slot in a U-shaped plate 23.

The total key is held in its normal outward position by a related spring 28 (Fig. 1) but when the key is depressed inwardly a notch 29 thereof is caught by a detent 30, and said detent is carried by a pair of arms 31 pivotally mounted at 33.

The machine also includes a main operating bar 20 which is carried by a pair of arms 53 loosely pivoted upon a stationary rod 55 and between which arms outside of the machine is carried the bar 20 and within the machine a bar 39 and a bar 69. The bar 20 is exterior of the cabinet and is depressed manually, the arms 53 and 54 rocking about the rod 55 and against the action of a return spring 56.

As is best shown in Fig. 1 pivoted at 66 to the key stem of the total key 200 is a key lever 67 having a coupling notch 68 engageable with the coupling bar 69 when the total key 200 is depressed. When the operating bar 20 is depressed the bar 69 will rock the key lever 67 about its pivot 66 counterclockwise to effect the total printing impression, as will be later explained.

Key releasing devices

It is, of course, necessary to release the depressed total key after the total printing operation of the machine and to this end as best shown in Fig. 1 the detent plate 30 has secured thereto a bracket 34 to which is pivoted at 36 a spring urged pawl 35. A coil spring 37 urges the pawl 35 counterclockwise so that a curved portion 38 normally hooks under the right angled bar 39 which is part of the main operating member 20. During the initial depression of bar 39 the pawl 35 will be rocked clockwise idly until the curved portion 38 is free of the bar 39 whereupon the spring 37 will cause the pawl 35 to take a position with the curved portion 38 now over the bar 39. When the bar 39 has been fully depressed and then returned the bar 39 will in its elevation strike the pawl 35 elevating the pawl 35 since the line of force acts through the center of the pivot 36. This will cause the rocking of the detent plate 30 about its pivot 33 disengaging the same from the notch 29 of the depressed key releasing it for its return to normal by its spring 28. Upon continued elevation of the pawl 35 a straight edge 40 of pawl 35 will by its coaction with a stationary rod 41 and upon continued elevation of the pawl 35 by the bar 39 rock the pawl 35 clockwise sliding its curved portion 38 to the left over the bar 39 until it is free of the bar 39, whereupon spring 37 will be effective to rock the pawl 35 counterclockwise to its normal position shown in Fig. 1 with the curved portion 38 now hooking under the bar 39.

Printing mechanism

The printing mechanism includes a frame which comprises a pair of side plates 175 and 176 (Figs. 1 and 3) connected together but spaced apart by certain cross members. The frame is pivoted about a shaft 177.

Over the item type wheels 88 and the two printing totalizers there is provided a cover plate 178 (Fig. 2) provided with a partially curved portion 179 which supports a supply roll of a paper strip 115 which passes beneath the two total printing platens 180 carried by the printing frame for the printing totalizers 121A and 121B, beneath a platen 181 for item type wheels 88, a roller 182, and over a roller 183 to the record strip winding roller 184. The cover plate 178 is suitably apertured so that the sets of printing wheels may be moved upwardly and project therethrough and force the record strip 115 against an inking ribbon 116 which passes over the record strip but against the platen.

The printing frame 175—176 carries the inking mechanism which comprises two rolls whereby the inking ribbon 116 feeds from one roll 185 over a roller 186, over the platen 181, around rollers 188, underneath the platen 181, over a roller 187, underneath the platen 180, over a roller 189, underneath the other platen 180, around rollers 190, to the other roll 191. As shown diagrammatically in Fig. 3 in dotted lines any suitable ink ribbon feeding and reversing mechanism 193 may be provided for feeding the ribbon step by step and reversibly feeding it from one roll to the other.

As previously stated the printer frame is pivoted at 177 so that it may be swung around pivot to facilitate the insertion of the record strip. When in its proper operating position the frame is latched by a spring-pressed latch member 192 (Fig. 1) thereby holding the printing platens rigid and immovable for printing operations.

Printing totals from the printing totalizers

At the termination of the transactions made for a certain period as, for example, at the end of the day, it is desirable to know the totals standing on each of the totalizers. This is preferably ascertained by printing the totals from the printing totalizers.

The total key 200 (Figs. 1 and 5) is depressed inwardly, as previously stated, so that when the key lever 67 (Figs. 1 and 3) of the total key 200 is shifted rearwardly, a pin 202 will register with the entrance of a cam slot 203 in a cam plate 204 secured to a shaft 205. The right end of the shaft 205 (see Fig. 3) has attached thereto a cam plate 206 provided with a pair of cam slots 207 cooperating with studs 132 and 135 attached to the arms 127 and 128, respectively. Upon the depression of the main operating bar 20 the cam lever 67 will be rocked and the pin 202 in cooperation with the cam slot 203 will rock the cam plate 204, shaft 205, and cam plate 206 thus rocking both arms 127 and 128 to force both printing totalizers 121A and 121B upwardly to move the record strip 115 and inking ribbon 116 against the printing platens 180 to effect an imprint on the top face of the record strip 115 and without direct contact between the type wheels and the inking ribbon 116. When the main operating bar is returned to normal the printing totalizers will assume their normal intermediate positions out of cooperation with the printing platens 180.

Locking devices

While the machine so far described is completely operative in all respects, it is desirable to utilize auxiliary locking devices to prevent improper operations.

For each totalizer there is provided a transverse locking bar 240 (Fig. 2) normally fitting as shown in Fig. 6 within the tooth spaces of the totalizer wheels 122 and which is a cross member of a yoked-shaped frame secured to a shaft 241. To each shaft 241 there is secured a plate 242 (Fig. 5) carrying a pin 243 and to which plate there is secured a spring 243a. The pin 243 of each plate engages a related guide slot 244 formed in a locking control plate 245. The guide slots 244 of the plate 245 receive the shafts 241 so as to guide the movement of the control plate 245.

Figure 5:
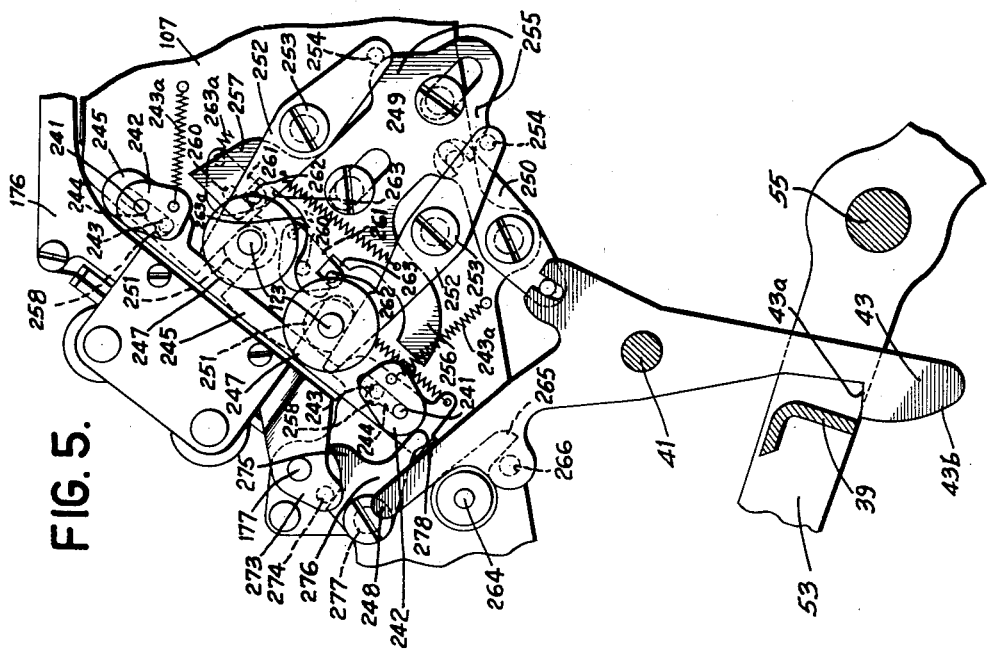
Fig. 5 is a view in side elevation of the right side of the printing mechanism.
Figure 4:
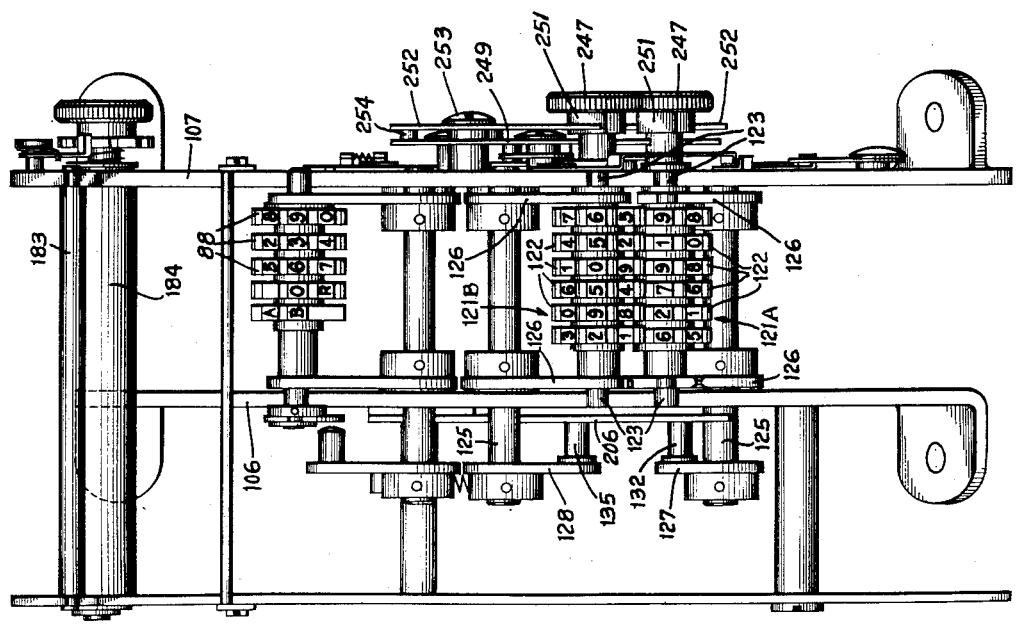
Fig. 4 is a plan view of the printing mechanism.

Obviously with the parts in the position shown in Figs. 2, 6 and 5 the locking bars 240 will lock the totalizer wheels against improper or accidental rotation because the bars 240 fit between the tooth spaces of the wheels.

As is more fully disclosed in the parent application Serial No. 87,333 the selected totalizer is actuated by the segments 79 shown in Figs. 6, 7 and 8. To engage the selected totalizer with the segments 79 the arms 126 of the selected totalizer are rocked to engage the totalizer wheels 122 with the segments. Since the locking bar 240 of the selected totalizer is normally held upwardly it will be seen from Fig. 7 that the teeth of the totalizer wheels 122 of the selected totalizer will be free of the related locking bar 240 so that the segments 79 may rotate the unlocked totalizer wheels 122.

Resetting totalizers

After the amounts of sales for a day or other regular intervals have been entered in the machine and the totals printed it is usually desirable to reset the totalizers so as to accumulate the amounts of sales occurring during a subsequent period. The means for accomplishing this is shown in Fig. 2 wherein it will be seen that each totalizer wheel is provided with a resetting pawl 246 and the related totalizer supporting shaft 123 is provided with resetting notches which are engageable with the ends of the resetting pawls 246. Each shaft 123 has secured thereto a reset knob 247 (Figs. 1 and 5) so that as each shaft is manually turned the notches of the shaft will engage with and pick up the variously positioned pawls and rotate the associated totalizer wheels to their zero positions. This construction of resetting mechanism is well known in the art and for this reason is only generally explained herein.

In order to release the totalizer wheels from the locking action by the bars 240 (Fig. 2) and unlock the normally locked reset knobs 247 and to define the zero position of the totalizer wheels the following described means is preferably employed.

As best shown in Fig. 5 loosely mounted on the rod 41 is a reset control lever 248 having a connection to a slidably mounted plate 249 by an interconnecting double arm 250, the connection being such that as the control lever is manually rocked clockwise the plate 249 will be elevated in an inclined direction.

Each reset knob 247 has secured thereto a disk 251 which is flattened so as to receive the upper arm of a double arm 252 pivoted at 253, the lower arm having a pin 254 engageable with a high portion 255 on the edge of the locking plate 249. In this manner each reset knob 247 is normally locked, but by the elevation of the plate 249 effected by rocking the reset control lever the high portions 255 will move away from the pins 254 releasing the double arms 252 and unlocking the reset knobs 247.

At the same time integral projections 256 and 257 (Fig. 9) of the locking plate 249 will rock each of said plates 242 and therefore, the shafts 241 whereby the locking bars 240 (Fig. 2) will be moved to unlocking position as is best shown in Fig. 8. At this time each pin 243 (Fig. 9) will enter a recess 258 offset from the related slot 244.

Either of the reset knobs 247 can now be turned until the counterclockwise rotation of the totalizer wheels caused by turning one of the knobs 247 is terminated by the high tooth 158 of an element 157 secured to a totalizer wheel (Fig. 2) striking a related zero stop finger 259 as the wheel comes to zero. The latter are positioned in a manner now to be described.

The group of zero stop fingers 259 for each totalizer is carried by a related rock shaft 260 to which is secured a plate 261 (Fig. 5) and a spring 263a attached to each plate causes a pin 262 carried by the plate to engage with the upper edge of a notch 263 of the plate 249. When the plate 249 is elevated it will be apparent that the spring 263a will rock the related plate 261 clockwise and the shaft 260 in the same direction as viewed in Fig. 2 bringing the zero stop fingers 259 to zero stop control position.

As best shown in Fig. 5 the reset control lever 248 has a lower integral projection 43 having edges 43a and 43b coacting with the bar 39. The purpose of the edge 43a is to coact with the bar 39 so as to lock the main operating bar 20 when the reset control lever 248 is moved, while the edge 43b locks the reset control lever 248 when the main operating bar is depressed to print a total.

When the reset control lever 248 is restored to normal the parts will be in the position shown in Fig. 5 and the totalizer wheels and reset knobs 247 will be again locked and zero stop fingers 259 will be moved out of locking position, and the locking bars 240 will be moved into locking position, as shown in Fig. 2.

As more fully described in the parent application the proprietor is provided with a lock and by means of the key of the lock a shaft 264 is rotated. Secured to the shaft 264 is an arm 265 coacting with a pin 266 carried by the reset control lever 248. The lock referred to is also provided with means to unlock the total key 200 so that by such lock controlled means only the proprietor can reset the totalizers or take a total printing operation.

Totalizer wheel locking means controlled by platen frame

It occasionally happens that the supply of detail strip paper runs out when the proprietor is absent and for this reason a clerk should be permitted to insert a new supply.

Access to the printer for this purpose requires access to the platen carrying frame (Fig. 5) to permit it to be raised to insert the detail strip. Obviously, its elevation would also carry the inking ribbon away from the cover plate 178 and permit a clerk to have access to the totalizer wheels 122 through the apertures in the cover plate 178.

A clerk, if dishonest, and if not otherwise prevented, could manually rock one of the plates 242 (Fig. 5) of a totalizer, since it is free to be rocked and accessible, withdrawing the locking bar 240 (Fig. 2) from the related totalizer wheels. By his finger or an implement a dishonest clerk could rotate the totalizer wheels to represent an improper total. Such fraudulent operations are to be guarded against and to prevent them in the present machine the following locking means is provided.

The side plate 176 (Fig. 5) is provided with an extension 273 carrying a pin 274 which is at the left of the pivot 177 of the platen frame. The pin 274 is in cooperation with a cam extension 275 of an arm 276 pivoted at 277 and bearing against a lug 278 of the control plate 245. When the platen carrying frame is elevated the pin 274 cooperating with the cam edge of the cam extension 275 will rock the arm 276 clockwise and shift the control plate 245 to the left thus causing the pins 243 to be out of cooperation with the recesses 258 and into cooperation with the extreme right ends of the guide slots 244. This will firmly lock the plates 242 and prevent the improper operations just described.

It will also be evident that if one of the plates 242 is rocked by a clerk its pin 243 will move in the recess 258 thus locking the plate 245 so that the arm 273 now being held immovable the printer frame can only be rocked a slight amount but insufficient to give access to the totalizer wheels.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a cash register, the combination with a plurality of axially aligned printing gear wheels, of a platen, a movable printer frame carrying said platen, said platen by the movement of the printer frame being movable away from said printing gear wheels giving access to said gear wheels, a pivoted frame carrying a transverse bar engageable with the plurality of gear wheels, said pivoted frame being freely rockable about its pivot when said printing gear wheels are moved towards said platen, and means operated by said printer frame for locking the pivoted frame when the platen is moved away from said printing gear wheels.

2. In a cash register, the combination with a printing totalizer, of a frame carrying a platen, said frame being movable to move the platen away from the printing totalizer to give access to printing elements of the printing totalizer, a transverse bar engaging said elements but freely movable with said printing elements as the latter are moved towards said platen for a total printing operation, means operable by said frame for positively holding said bar against movement when the platen is moved, a manipulative means settable prior to a resetting operation of said printing elements, means operated by said manipulative means for moving said bar out of cooperation with said printing elements for releasing the latter for a resetting operation, and means rendered effective by the movement of said manipulative means when the latter moves the bar out of cooperation with said printing elements for locking said frame against movement.

3. In a cash register of the type having totalizer actuators, the combination with a movable printing totalizer, of a transverse bar normally engageable with tooth spaces between printing elements of the printing totalizer, means for holding said bar to effect its disengagement from the tooth spaces of said printing elements when the printing totalizer is moved to engage with said actuators, a manipulative means settable prior to a resetting operation for said totalizer, and means operated by said manipulative means for moving said bar to effect its disengagement from the tooth spaces of said elements for releasing the latter for a resetting operation.

4. In a machine of the class described, the combination with a series of totalizer gear wheels, of a transverse bar normally locking said gear wheels, resetting means for said gear wheels, means for normally locking said resetting means, a manipulative means settable prior to a resetting operation, and means operated by said manipulative means for disabling said locking means and concurrently operating means for moving said bar to an unlocking position.

5. In a machine of the class described, the combination with a set of printing wheels, movable to one position for actuation and to another position for effecting an impression therefrom, of means for locking said printing wheels, means for normally holding said locking means to effect a relative disengagement between said locking means and said printing wheels when the latter are moved to one position for actuation thereof, and means for causing said locking means to retain the locking engagement with said printing wheels when the latter are moved to the other position to effect a printing impression therefrom.

6. In a machine of the class described, the combination with a movable printing totalizer comprising total printing wheels, of a movable platen coacting with said printing wheels, means for moving said printing totalizer against said platen when the latter is stationary to effect a total imprint from said printing wheels, means movable with said prining totalizer when the latter is moved to effect a total imprint, and means rendered effective by said last-named means to lock said platen during the movement of said printing totalizer.

7. In a machine of the class described, the combination with a movable totalizer having rotatable totalizing elements, of means for locking the elements of said totalizer against rotation, a control slide provided with a slot and a recess emerging from said slot, a movable frame for said locking means, a member movable with said frame, a pin normally opposite said recess and carried by said member and coacting with an edge of said slot for retaining said locking means in locking position, and means for moving said frame whereby said pin is received by said recess to cause said locking means to be moved to an unlocking position.

8. In a machine of the class described, the combination with a movable totalizer having rotatable totalizing elements, of means for locking the elements of said totalizer against rotation, a control slide provided with a slot and a recess emerging from said slot, a movable frame for said locking means, a pin normally opposite said recess and carried by said member and a member movable with said frame, and coacting with an edge of said slot for retaining said locking means in locking position, means for moving said frame whereby said pin is received by said recess to cause said locking means to be moved to an unlocking position, and means for moving said control slide to cause said pin to coact with the edge of said slot but out of cooperation with said recess whereby said frame is locked against movement to positively hold said locking means in locking position.

9. In a machine of the class described, the combination with a set of wheels constituting denominationally set elements of a totalizer, of transfer actuating elements for said wheels constituting zero stops for said wheels, a movable transverse bar normally coacting with said wheels, zero stop fingers for said transfer actuating elements, a control slide, a manipulative means operable as a preliminary to a reset operation for said totalizer for actuating said slide, means operable by the actuation of said slide for shifting the zero stop fingers for coaction with said zero stop elements and other means operable by the actuation of said slide for moving said transverse bar to unlocking position to release said wheels for resetting operation.

10. In a machine of the class described, the combination with a totalizer comprising a plurality of wheels, of a zero reset shaft for said totalizer provided with a reset knob having a locking edge, a locking element coacting with said edge, a locking bar normally coacting with said wheels, means to move said locking bar out of locking relationship with said wheels, a manipulative means set by the operator prior to a reset operation effected by rotation of said reset knob to rotate said zero reset shaft, and means operable by said manipulative means for rendering said locking element ineffective to release said knob for actuation and for concurrently causing the operation of said means to move said locking bar out of locking relationship with said wheels.

11. In a cash register of the class described, the combination with a printing totalizer, of an impression platen for said totalizer, a manually operated main operating means for said cash register, means operable by said main operating means for effecting a relative movement of said printing totalizer and said platen to effect a total print from said totalizer, a total printing control key, means operable by said key for manually connecting said operating means and said second named means, a device settable prior to a resetting operation for said totalizer, and mechanism cooperating with said device and said manually operated main operating means for preventing the operation of one to the exclusion of the operation of the other.

12. In a machine of the class described, the combination with a set of printing wheels movable to one position for actuation and to another position for effecting an impression therefrom, of means for locking said printing wheels against rotation, a control plate provided with means for normally holding said locking means to effect a relative disengagement between the locking means and said printing wheels when the latter are moved to one position for actuation thereof, means for causing said locking means to retain the locking engagement with said printing wheels when the latter are moved to the other position to effect a printing impression therefrom, a platen coacting with said printing wheels, a movable supporting means for said platen, said supporting means being stationary relative to the printing wheels when the latter are moved to cause the platen to effect the aforesaid printing impression, and said supporting means also having a movement relative to the printing wheels away from said wheels, means operated by said supporting means in response to its movement away from the platen for causing said plate to be moved, and means provided on said control plate to cause by the aforesaid movement of the plate the locking of the locking means.

FREDERICK L. FULLER.

CERTIFICATE OF CORRECTION.

Patent No. 2,230,682. February 4, 1941.

FREDERICK L. FULLER.

It is hereby certified that error appears in the printed specification of the above numbered patent requiring correction as follows: Page 4, second column, line 40, claim 6, for "prining" read --printing--; lines 65, 66 and 67, claim 8, for the words "a pin normally opposite said recess and carried by said member and a member movable with said frame, and coacting" read --a member movable with said frame, a pin normally opposite said recess and carried by said member and coacting--; line 74, same claim, for "edge" read --edges--; and that the said Letters Patent should be read with this correction therein that the same may conform to the record of the case in the Patent Office.

Signed and sealed this 11th day of March, A. D. 1941.

(Seal)

Henry Van Arsdale,
Acting Commissioner of Patents.